(12) United States Patent
Eda et al.

(10) Patent No.: US 12,554,615 B2
(45) Date of Patent: Feb. 17, 2026

(54) DETERMINING A QUIESCE TIMEOUT FOR A CONTAINERIZED WORKLOAD

(71) Applicant: INTERNATIONAL BUSINESS MACHINES CORPORATION, Armonk, NY (US)

(72) Inventors: Sasikanth Eda, Vijayawada (IN); Abhishek Jain, Baraut (IN); Deepak R. Ghuge, Ahmednagar (IN)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 18/168,744

(22) Filed: Feb. 14, 2023

(65) Prior Publication Data

US 2024/0273001 A1  Aug. 15, 2024

(51) Int. Cl.
G06F 11/30 (2006.01)
G06F 11/14 (2006.01)
G06F 11/1446 (2026.01)

(52) U.S. Cl.
CPC ...... *G06F 11/3089* (2013.01); *G06F 11/1461* (2013.01); *G06F 2201/805* (2013.01)

(58) Field of Classification Search
CPC ............. G06F 11/3089; G06F 11/1461; G06F 2201/805
(Continued)

(56) References Cited

U.S. PATENT DOCUMENTS 5,894,328 A * 4/1999 Negishi ............ G11B 20/10527
386/341
8,463,748 B1 6/2013 Kushwah
(Continued)

FOREIGN PATENT DOCUMENTS

CN 115349117 B 3/2023

OTHER PUBLICATIONS

No Author, "Identify Memory Saturation in AKS Clusters", Nov. 12, 2022, 7 Pgs, <https:///learn.microsoft.com/en-us/troubleshoot/azure/azure-kubernetes/identify-memory-saturation-aks>.
Red Hat Openshift, "Automatically Scaling Pods With the Horizontal Pod Autoscaler", Dated Nov. 18, 2022, 25 Pgs, <https://docs.openshift.com/container-platform/4.7/nodes/pods/nodes-pods-autoscaling.,html>.
International Search Report for International Application No. PCT/IB2024/050045, International Filing Date: Jan. 3, 2024, Mailing Date: Jul. 3, 2024, 6 pages.

*Primary Examiner* — Idriss N Alrobaye
*Assistant Examiner* — Henry W Yu
(74) *Attorney, Agent, or Firm* — Eric W. Chesley

(57) ABSTRACT

Described are techniques for determining a quiesce timeout for a containerized workload used to identify a storage unit for the containerized workload. The techniques include determining an Input/Output (I/O) rate associated with a containerized workload that executes in a container environment, where the containerized workload interfaces with a storage system to store the data. The techniques further include determining a quiesce timeout for the containerized workload that is based at least in part on the I/O rate of data associated with the containerized workload and an amount of memory allocated for buffering the data during performance of a backup operation without incurring an I/O overflow. The techniques further include determining storage unit specifications that enable performance of the backup operation within the quiesce timeout and evaluating storage units available to the container environment to identify a storage unit for the containerized workload based on the storage unit specifications.

20 Claims, 5 Drawing Sheets

(58) Field of Classification Search
USPC ....... 710/6, 15, 18, 33, 46, 52, 58, 105, 109
See application file for complete search history.

(56) References Cited

U.S. PATENT DOCUMENTS

| | | | |
|---|---|---|---|
| 10,160,107 B2 * | 12/2018 | Yang | B25C 1/041 |
| 10,768,848 B2 * | 9/2020 | Wigmore | G06F 11/1448 |
| 11,347,684 B2 | 5/2022 | Alluboyina | |
| 11,354,060 B2 | 6/2022 | Jayaraman | |
| 11,750,706 B1 * | 9/2023 | Watson | G06F 3/1236 |
| | | | 709/227 |
| 2002/0091668 A1 * | 7/2002 | Karasudani | G11B 27/329 |
| | | | 386/E9.013 |
| 2008/0201474 A1 * | 8/2008 | Yamada | H04L 67/08 |
| | | | 709/226 |
| 2013/0204843 A1 * | 8/2013 | Boldo | G06F 11/1471 |
| | | | 707/649 |
| 2014/0298092 A1 * | 10/2014 | Boldo | G06F 11/1458 |
| | | | 714/20 |
| 2017/0142034 A1 * | 5/2017 | K | H04L 45/38 |
| 2018/0024889 A1 * | 1/2018 | Verma | G06F 11/0766 |
| | | | 714/15 |
| 2018/0196821 A1 | 7/2018 | Kottomtharayil | |
| 2019/0250946 A1 * | 8/2019 | Parameshwaran | G06F 9/5088 |
| 2021/0004267 A1 * | 1/2021 | Cui | G06F 9/45558 |
| 2022/0206902 A1 | 6/2022 | Hoang | |
| 2023/0080300 A1 * | 3/2023 | Panikkar | G06F 9/5072 |
| | | | 718/105 |

* cited by examiner

DETERMINING A QUIESCE TIMEOUT FOR A CONTAINERIZED WORKLOAD

BACKGROUND

The present disclosure relates to container orchestration, and, more specifically, to mapping containerized workloads to storage units.

Containers are a method of building, packaging, and deploying software. In the simplest terms, a container includes both application code and the dependencies that the application code needs to run properly. Multiple containers (also called containerized workloads or containerized applications) can run on the same machine and share an operating system (OS) kernel with other containers, each running as isolated processes in a user space. Container orchestration is the automation of operational tasks needed to run containerized workloads or applications and services. These operational tasks include management of a container's lifecycle, such as container provisioning, deployment, scaling (up and down), networking, and load balancing.

SUMMARY

Aspects of the present disclosure are directed toward a computer-implemented method comprising determining an Input/Output (I/O) rate associated with a containerized workload that executes in a container environment, where the containerized workload interfaces with a storage system to store the data. Aspects of the present disclosure further include determining a quiesce timeout for the containerized workload that is based at least in part on the I/O rate of data associated with the containerized workload and an amount of memory allocated for buffering the data during performance of a backup operation without incurring an I/O overflow. Aspects of the present disclosure further include determining storage unit specifications that enable performance of the backup operation within the quiesce timeout and evaluating storage units available to the container environment to identify a storage unit for the containerized workload based on the storage unit specifications.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the present disclosure. The drawings are only illustrative of certain embodiments and do not limit the present disclosure.

Figure 1:
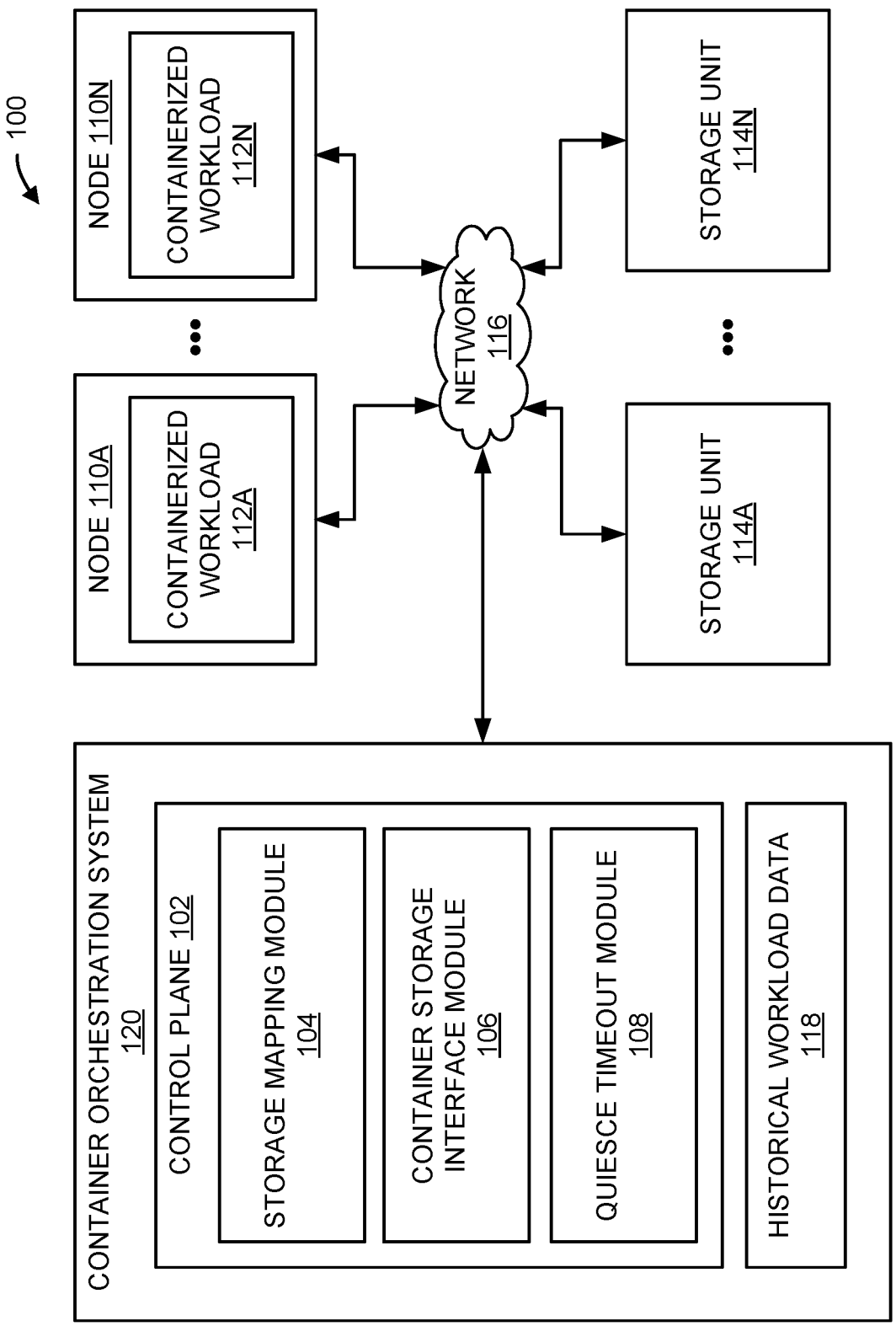
FIG. 1 is a block diagram illustrating an example container orchestration system, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward determining a quiesce timeout for a containerized workload that allows a backup operation to complete successfully, and mapping the containerized workload to a storage unit based at least in part on the quiesce timeout. While not limited to such applications, embodiments of the present disclosure may be better understood in light of the aforementioned context.

Container orchestration automates the deployment, management, scaling, and networking of containerized workloads. Containerization is the packaging of software code with operating system (OS) libraries and dependencies needed to execute the software code, thereby creating a single lightweight executable, referred to herein as a containerized workload, which executes consistently on general computing platforms.

Containerized workloads have complex management specifications that become more complex when scaled. To manage this complexity, container orchestration systems include a data store and filesystem that provide a consistent source of truth about the status of the containerized workloads at any given point in time. For example, in the context of the KUBERNETES® container orchestration system, etcd is an open-source distributed key-value store that is used to hold and manage critical information needed to execute properly, such as configuration data, state data, and metadata for containerized workloads managed by the container orchestration system.

Periodically performing a backup of a filesystem used by containerized workloads is important to recover the containerized workloads in the event of a disaster scenario. A backup of the filesystem can be created to preserve the contents of the filesystem at a single point in time. The backup contains the states of the containerized workloads and other critical information. Backup operations (e.g., snapshot creation and/or deletion) provide an online backup capability that allows recovery from common problems, such as accidental deletion of a file, and comparison with older versions of a file.

Performing backup operations require a brief interruption in access to a filesystem. The interruption allows backup processing to obtain a consistent point-in-time image of the filesystem, and allows updates to various internal databases with backup information. The mechanism for interrupting access to the filesystem is referred to as a quiesce. While performance of a backup operation can take just a few seconds, the process of reaching a quiesced state may take longer due to the operations needed to reach the quiesced state. As an illustration, a snapshot quiesce works by sending, from a backup process, a remote procedure call (RPC) to all nodes (virtual or physical computers) that have the filesystem mounted. On each node, an RPC handler blocks new filesystem operations from starting and waits for currently executing filesystem operations to complete. The backup process also blocks daemon threads (e.g., housekeeping threads) that access the filesystem from executing. The backup process then performs the snapshot operation. Thereafter, the backup process sends a resume RPC to the nodes instructing them to allow filesystem operations and daemon threads to return to normal operation. The time to reach the quiesced state, perform one or more snapshot operations, and return to normal operations, is a snapshot quiesce period.

The snapshot quiesce process described above is problematic in high-frequency containerized workload environments when snapshots are created and deleted frequently. This is because the container orchestration system does not know whether a storage unit (a unit of processing and memory) allocated to a containerized workload is sufficient to buffer the containerized workload's input/output (I/O) during the snapshot quiesce period. Failure to buffer the I/O during the snapshot quiesce period can cause the snapshot operation to fail, and result in I/O data loss for the containerized workload. This lack of intelligence by the container orchestration system can result in non-optimized scheduling of containerized workloads and creates problems in terms of snapshots failures, backup failures, application downtime, and storage resource inefficiencies.

Advantageously, aspects of the present disclosure overcome these challenges by determining a quiesce timeout for an individual containerized workload that allows performance of a storage backup operation without incurring an I/O overflow, and mapping the individual containerized workload to a storage unit based at least in part on the quiesce timeout. More specifically, aspects of the present disclosure determine an I/O rate associated with a containerized workload that executes in a container environment, where the containerized workload interfaces with a storage system to perform storage operations. Aspects of the present disclosure then determine a quiesce timeout for the containerized workload, where the quiesce timeout is based at least in part on the I/O rate and an amount of memory needed to buffer I/O associated with the containerized workload during performance of a backup operation without incurring an I/O overflow. Aspects of the present disclosure then determine storage unit specifications that enable performance of the backup operation within the quiesce timeout. Aspects of the present disclosure then evaluate storage units available to the container environment to identify a storage unit for the containerized workload based on the storage unit specifications. Aspects of the present disclosure can then assign the storage unit to the containerized workload, thereby providing a sufficient amount of computing resources (processing and memory) to the containerized workload that enables a backup operation to be performed without experiencing an I/O overflow. Accordingly, the aspects of the present disclosure provide improvements to a computer-related technology by optimizing allocation of a storage unit to a containerized workload using a quiesce timeout calculated for the containerized workload, thereby increasing backup reliability of an associated filesystem by reducing a number of backup failures.

Referring now to the figures, FIG. 1 illustrates a block diagram of an example container environment 100 that includes a container orchestration system 120 configured to determine a quiesce timeout for a containerized workload 112A, 112N (collectively 112, where N can refer to any positive integer representing any number of containerized workloads), and match the containerized workload 112 to a storage unit 114A, 114N (collectively 114, where N can refer to any positive integer representing any number of storage units) based on the quiesce timeout, in accordance with some embodiments of the present disclosure. As illustrated, the container orchestration system 120 is in network communication with a plurality of nodes 110A, 110N (collectively 110, where N can refer to any positive integer representing any number of nodes). The nodes 110 comprise virtual or physical machines that host one or more containerized workloads 112. The container orchestration system 120 manages various aspects of the container environment 100 including automating container deployment, scaling, and management.

A control plane 102 of the container orchestration system 120 comprises a collection of modules (processes) used to manage various aspects of the containerized workload lifecycle. The modules can include a storage mapping module 104, container storage interface module 106, quiesce timeout module 108, and other modules, as will be appreciated.

The storage mapping module 104 of the control plane 102 maps (e.g., assigns) containerized workloads 112 to storage units 114. Generally, the storage mapping module 104 selects a storage unit 114 for a newly created or not yet scheduled (unscheduled) containerized workload 112. Because containerized workloads 112 can have different requirements, the storage mapping module 104 identifies a storage unit 114 that is specific to the containerized workload's requirements. When scheduling the containerized workload 112, the storage mapping module 104 can assign a storage unit 114 to the containerized workload 112 that corresponds to a quiesce timeout calculated for the containerized workload 112. In some embodiments, as described later in association with FIG. 3, prior to the performance of a backup operation (e.g., snapshot operation), the storage mapping module 104 can determine whether a storage unit 114 currently assigned to a containerized workload 112 corresponds to a quiesce timeout for the containerized workload 112, and perform one or more remedial actions when the currently assigned storage unit 114 does not correspond to the quiesce timeout.

The storage units 114 comprise heterogeneous data storage devices and systems available for assignment to the containerized workloads 112 managed by the container orchestration system 120. The storage units 114 host filesystems that store data associated with processes executed by the containerized workloads 112. The storage units 114 comprise persistent storage which can be mounted to a container (e.g., pod) comprising a containerized workload 112. The storage units 114 can be heterogenous, and can include a variety of storage systems and devices, including cloud based storage (e.g., storage provided by a storage service provider). Computing resources (e.g., processing, memory, storage, and software) used to implement the storage units 114 vary, such that some storage units 114 are able to perform storage operations and storage related operations faster than other storage units 114. For example, a first storage unit 114A may be implemented using computing resources that enable a snapshot operation to be performed within ten second period, whereas a second storage unit 114N may be implemented using computing resources that enable the same snapshot operation to be performed within a five second period. The ability of a storage unit 114 to perform a backup operation within a quiesce timeout of a containerized workload 112 depends, at least in part, upon the computing resource specifications of the storage unit 114.

Accordingly, as part of mapping a storage unit 114 to a containerized workload 112, the storage mapping module 104 identifies a storage unit 114 that corresponds to a quiesce timeout of the containerized workload 112, and schedules the containerized workload 112 to be assigned to the storage unit 114. As an example, the storage mapping module 104 obtains (or requests) a quiesce timeout from the quiesce timeout module 108, which is configured to determine the quiesce timeout for individual containerized workloads 112, as described below. Based on the quiesce timeout for a containerized workload 112, the storage mapping module 104 identifies storage unit specifications (e.g., read/write speed, buffer flush rate, etc.) that enable a backup operation to be performed by a storage unit 114 within the quiesce timeout of the containerized workload 112. The storage mapping module 104 uses the storage unit specifications to identify a storage unit 114 that is available for assignment to the containerized workload 112. For example, the storage mapping module 104 can query one or more container storage interface modules 106 for a storage unit 114 that meets the storage unit specifications. After identifying a storage unit 114 that corresponds to the storage unit specifications, the storage mapping module 104 schedules the containerized workload 112 to be assigned to the storage unit 114.

The quiesce timeout module 108 calculates estimated quiesce timeouts for containerized workloads 112 managed by the container orchestration system 120. A quiesce timeout calculated for a containerized workload 112 by the quiesce timeout module 108 is provided to the storage mapping module 104 to allow identification of a storage unit 114 capable of performing a backup operation within the quiesce timeout of the containerized workload 112. A quiesce timeout for a containerized workload 112 is an amount of time in which a backup operation (e.g., a snapshot operation), associated with a filesystem utilized by the containerized workload 112, can be performed without incurring an I/O overflow (e.g., overflow of buffered I/O data associated with the containerized workload 112) during performance of the backup operation. The quiesce timeout can include a time to reach a quiesced state and a time to perform the backup operation. An I/O overflow occurs when a containerized workload 112 attempts to write more I/O data to allocated memory than what the memory is capable of holding. Because the I/O data held in the memory cannot be written to the filesystem when in the quiesced state, attempting to write more I/O data to the memory than what the memory buffer is capable of holding can result in I/O data loss, backup operation failure, application downtime, etc.

The quiesce timeout module 108 calculates a quiesce timeout for a containerized workload 112 by: determining a time to quiesce a filesystem utilized by the containerized workload 112, determining an I/O buffer size for storing I/O data related to the containerized workload 112 during performance of a backup operation, and determining an I/O rate associated with the containerized workload 112. Based on time to quiesce the filesystem, the I/O buffer size, and the I/O rate, the quiesce timeout module 108 calculates an amount of time in which I/O data associated with the containerized workload 112 can be buffered without incurring an I/O overflow. This amount of time comprises the quiesce timeout for the particular containerized workload 112.

More specifically, in some embodiments the quiesce timeout module 108 determines an I/O buffer size for a containerized workload 112 by identifying an amount of computing resources (processing, memory, local storage) available for buffering the containerized workload's I/O data. Specifications for the computing resources allocated for buffering the containerized workload's I/O data can be obtained via the control plane 102 of the container orchestration system 120, and the computing resource specifications indicate an amount of node 110 resources (processing, memory, local storage) that are allocated for buffering containerized workload I/O data. Illustratively, a container orchestration system 120 allocates node 110 computing resources to a containerized workload 112 when scheduling (assigning) the containerized workload 112 to the node 110. For example, in the context of the KUBERNETES® container orchestration system, the quiesce timeout module 108 can obtain the computing resource specifications from a node object (node representation) associated with a node 110 that hosts a containerized workload 112.

Along with determining an I/O buffer size available to a containerized workload 112, the quiesce timeout module 108 obtains an I/O rate for the containerized workload 112. In some embodiments, the quiesce timeout module 108 analyzes historical workload data 118 associated with the containerized workload 112 to estimate the I/O rate. The I/O rate can be based on historical I/O performance metrics (e.g., I/O operations per second, bandwidth, response time, etc.). Alternatively, in some embodiments, when historical workload data 118 is not available for the containerized workload 112, the quiesce timeout module 108 attempts to identify historical workload data 118 associated with one or more similar containerized workloads (containerized workloads having specifications that are similar to the particular containerized workload 112). If historical workload data 118 for one or more similar containerized workloads is identified, the quiesce timeout module 108 analyzes the historical workload data 118 to estimate an I/O rate which can be used as part of determining the quiesce timeout for the individual containerized workload 112.

In cases where historical workload data 118 may not be available for the containerized workload 112 (e.g., a particular application), the quiesce timeout module 108, in some embodiments, determines the I/O rate for the containerized workload 112 by monitoring I/O operations associated with the containerized workload 112. For example, in the context of the KUBERNETES® container orchestration system, a Kubelet (node agent) reports resource usage of a pod as part of a pod status. The quiesce timeout module 108 can analyze the resource usage reported by the Kubelet to determine the I/O rate for the pod.

In some embodiments, both a historical I/O rate and a current I/O rate can be used to calculate the quiesce timeout of a containerized workload 112. Illustratively, the quiesce timeout module 108 obtains the historical I/O rate from historical workload data 118, and obtains the current I/O rate via monitoring the I/O operations associated with the containerized workload 112. The quiesce timeout module 108 then evaluates (compares) the historical I/O rate and the current I/O rate to estimate an I/O rate for calculating the quiesce timeout of the containerized workload 112.

As mentioned above, in some embodiments the quiesce timeout module 108 determines an estimated time to quiesce a filesystem utilized by a containerized workload 112. The estimated quiesce time is a time that may be needed for the filesystem to reach a quiesced state, in which storage operations associated with the filesystem are blocked, paused, or suspended. Illustratively, quiescing a filesystem comprises a process of placing on-disk data of a physical or virtual storage system into a state suitable for a backup. The process can include operations such as flushing dirty memory buffers from an operating system's in-memory cache to storage disk, or other higher-level, application-specific tasks, as well as blocking new storage operations from starting, waiting for currently executing storage operations to complete, and/or suspending some storage related processes (including housekeeping processes).

In some embodiments, determining an estimated time to reach a quiesced state can include estimating an amount of time to flush I/O data (copy the I/O data) from the node's I/O buffer to persistent storage provided by a storage unit 114. A rate at which the I/O data can be flushed from the I/O buffer to the storage unit 114 can be determined based on a data throughput rate for the components involved (e.g., processor(s), memory, network hardware, etc.). Also, in some embodiments, determining the estimated time to reach the quiesced state can include estimating an amount of time to complete pending storage operations associated with the containerized workload 112. The time estimate can be based on a typical processing time associated with storage operations performed on behalf of the containerized workload 112. For example, containerized workloads 112 that handle large amounts of data may be associated with longer processing times as compared to containerized workloads 112 that handle small amounts of data.

After collecting the backup related information described above, the quiesce timeout module 108 calculates the quiesce timeout for the containerized workload 112 based at least in part on the backup related information (I/O buffer size, I/O rate, and estimated filesystem quiesce time). Illustratively, the calculation can comprise summing the amount of time for the filesystem to reach a quiesced state and the amount of time that the containerized workload's I/O data can be buffered at the node 110 before reaching capacity, as determined by the I/O rate. The resulting quiesce timeout indicates a time in which a backup operation of the filesystem can be successfully performed without experiencing a buffer overflow of containerized workload I/O data. Having calculated the quiesce timeout for the containerized workload 112, the quiesce timeout can be used by the storage mapping module 104 to map the containerized workload 112 to a storage unit 114 that has storage unit specifications that indicate that the storage unit 114 is capable of performing the backup operation within the quiesce timeout.

As described earlier, the storage mapping module 104 identifies a storage unit 114 that corresponds to the quiesce timeout of the containerized workload 112 and schedules the containerized workload 112 to be assigned to the storage unit 114. In cases were the storage mapping module 104 is unable to identify a storage unit 114 that has specifications corresponding to the quiesce timeout of a containerized workload 112, the storage mapping module 104 can allocate additional memory of a node 110 to the containerized workload 112 to enable buffering of the containerized workload's I/O during backup operation processing, thereby potentially preventing an I/O overflow during performance of the backup operation.

In some embodiments, the storage mapping module 104 can evaluate a current assignment of a storage unit 114 to a containerized workload 112 to determine whether the specifications of the storage unit 114 correspond to a quiesce timeout calculated for the containerized workload 112. In some embodiments, the evaluation can be performed in response to a backup operation error linked to the containerized workload 112. In the case that the storage unit specifications do not allow a backup operation to be performed within the quiesce timeout, the storage mapping module 104 identifies an alternative storage unit 114 that is capable of performing the backup operation within the quiesce timeout, and migrates the containerized workload 112 to the alternative storage unit 114. For example, the storage mapping module 104 can determine that the currently assigned storage unit 114 has insufficient computing resources to enable the backup operation to complete successfully within the quiesce timeout, and migrate the containerized workload 112 to another storage unit 114 identified as being able to perform the backup operation within the quiesce timeout.

FIG. 1 illustrates that a network 116 is provided to enable communication between the components of the container environment 100. The network 116 can include any useful computing network, including an intranet, the Internet, a local area network, a wide area network, a wireless data network, or any other such network or combination thereof. Components utilized for the network 116 can depend at least in part upon the type of network and/or environment selected. Communication over the network 116 can be enabled by wired or wireless connections and combinations thereof.

Figure 5:
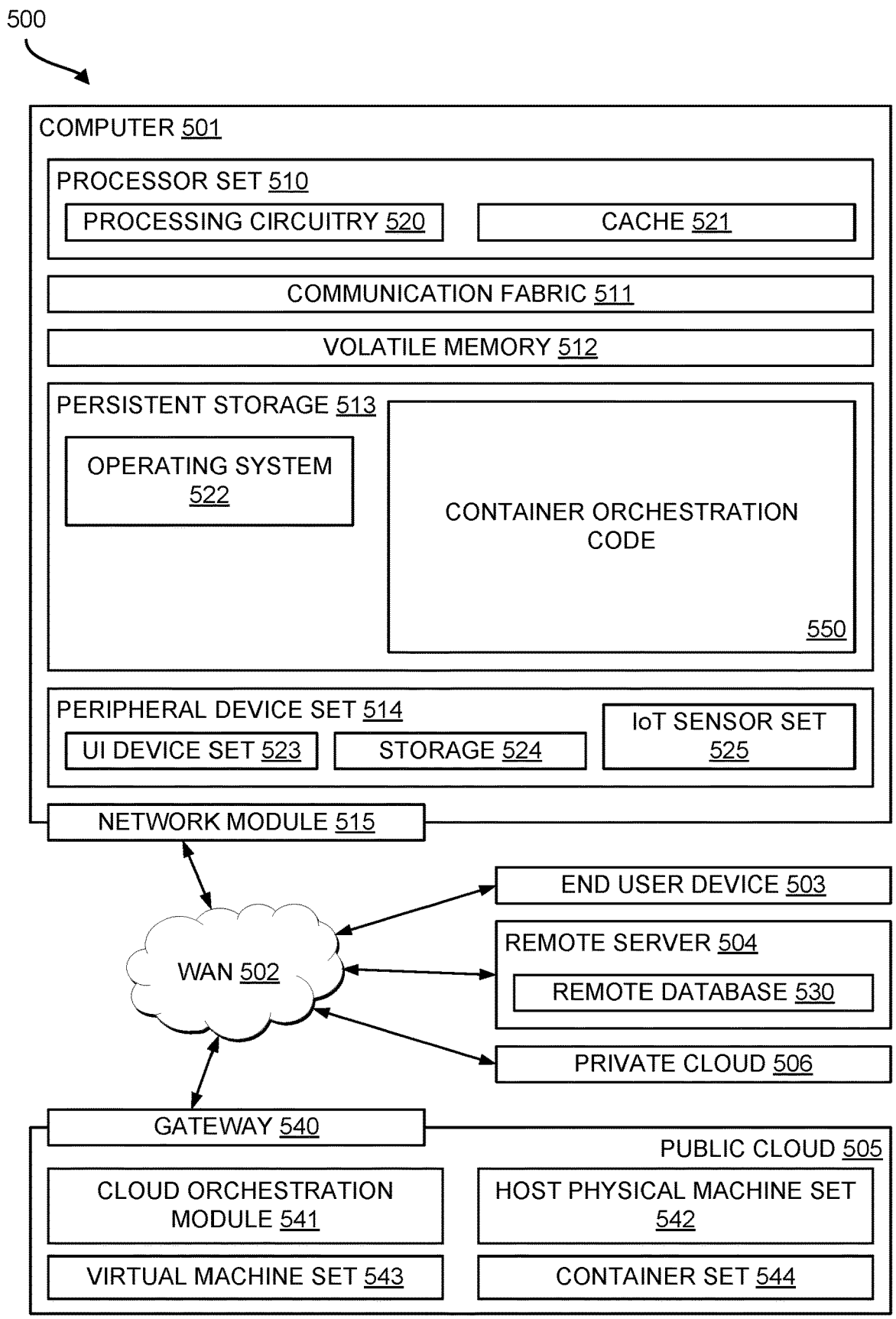
FIG. 5 is a block diagram that illustrates an example computing environment in which aspects of the present disclosure can be implemented, in accordance with some embodiments of the present disclosure.

In this illustrative example, the container environment 100 includes components that can be implemented in hardware such as the hardware shown in computing environment 100 in FIG. 5. For example, the container orchestration system 120 can be implemented in software, hardware, firmware or a combination thereof. When software is used, the operations performed by the container orchestration system 120 can be implemented in program instructions configured to run on hardware, such as a processor unit. When firmware is used, the operations performed by the container orchestration system 120 can be implemented in program instructions and data and stored in persistent memory to run on a processor unit. When hardware is employed, the hardware can include circuits that operate to perform the operations of the container orchestration system 120.

Furthermore, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices.

As used herein, a processor is a hardware device and is comprised of hardware circuits such as integrated circuits that respond to and process instructions and program instructions that operate a computer. A processor can be implemented using the processor set 510 in FIG. 5. A processor can be one or more processor units that are on the same computer or on different computers. That is, a process can be distributed between processor units on the same or different computers in the container environment 100. Further, the number of processor units can be of the same type or different type of processor units. For example, the number of processor units can be selected from at least one of a single core processor, a dual-core processor, a multi-processor core, a general-purpose central processing unit (CPU), a graphics processing unit (GPU), a digital signal processor (DSP), or some other type of processor unit.

In some embodiments, the modules described in association with FIG. 1 can be implemented as computing services hosted in a computing service environment. For example, a module can be considered a service with one or more processes executing on a server or other computer hardware. Such services can provide a service application that receives requests and provides output to other services or consumer devices. An API can be provided for each module to enable a first module to send requests to and receive output from a second module. Such APIs can also allow third parties to interface with the module and make requests and receive output from the modules.

While FIG. 1 illustrates an example of a container environment that can implement the techniques above, many other similar or different environments are possible. The illustration of the container environment in FIG. 1 is not meant to imply physical or architectural limitations to the manner in which an illustrative embodiment can be implemented. Other components in addition to, or in place of, the ones illustrated can be used. Some components may be unnecessary. Also, the blocks are presented to illustrate some functional components. One or more of these blocks can be combined, divided, or combined and then divided into different blocks when implemented in an illustrative embodiment.

Figure 2:
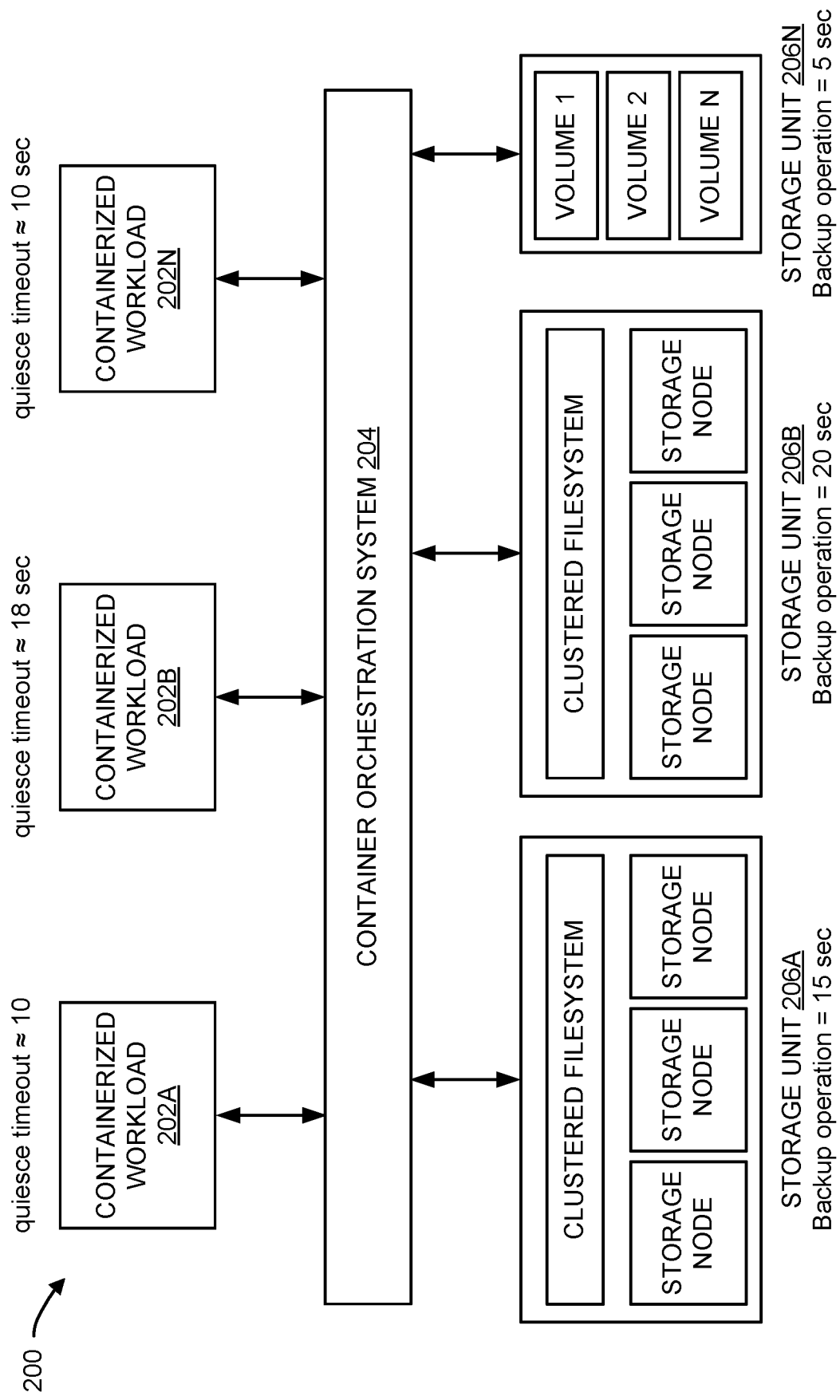
FIG. 2 is a diagram that illustrates hypothetical scenarios for mapping containerized workloads to storage units based in part on estimated quiesce timeouts for the containerized workloads, in accordance with some embodiments of the present disclosure.

FIG. 2 is a diagram illustrating hypothetical scenarios 200 for mapping containerized workloads 202A, 202B, 202N (collectively 202, where N can refer to any positive integer representing any number of containerized workloads) to storage units 206A, 206B, 206N (collectively 206, where N can refer to any positive integer representing any number of storage units) based in part on estimated quiesce timeouts calculated for the containerized workloads 202, in accordance with some embodiments of the present disclosure.

In a first hypothetical scenario, containerized workload 202A is currently assigned (mounted to) storage unit 206A, which has computing resources capable of performing a backup of a filesystem utilized by containerized workload 202A within fifteen seconds. The container orchestration system 204 determines that the quiesce timeout for containerized workload 202A is approximately 10 seconds (based on an incoming I/O rate and memory buffer size), which is not enough time for storage unit 206A to reliably perform the backup operation. In response, prior to performance of the backup of the filesystem, the container orchestration system 204 migrates containerized workload 202A to storage unit 206N, which has computing resources capable of performing the backup operation reliably within five seconds, which corresponds to the quiesce timeout because the backup can be performed without incurring an I/O overflow. The migration of containerized workload 202A comprises, copying data stored on storage unit 206A associated with containerized workload 202A to storage unit 206N, and pointing (mounting) containerized workload 202A to storage unit 206N.

In a second hypothetical scenario, containerized workload 202B is currently assigned to storage unit 206B, which is capable of performing a backup operation within twenty seconds. The container orchestration system 204, in response to determining that the quiesce timeout for containerized workload 202B is approximately eighteen seconds (which is less time than what is reliably needed for storage unit 206B to perform the backup), migrates containerized workload 202B to storage unit 206A (which is capable of performing the backup operation within fifteen seconds) prior to performance of the backup of the filesystem to ensure that the backup is successful.

In a third hypothetical scenario, containerized workload 202N is currently assigned to storage unit 206N, which is capable of performing a backup operation within five seconds. The container orchestration system 204 determines that the quiesce timeout for containerized workload 202N is approximately ten seconds. Because the time to perform the backup by storage unit 206N is significantly less than what is needed to meet the quiesce time of containerized workload 202N, and to balance the storage load of the containerized workloads 202 among the storage units 206, the container orchestration system 204 migrates containerized workload 202N to storage unit 206A, which is capable of performing the backup operation within the quiesce timeout of containerized workload 202N.

Figure 3:
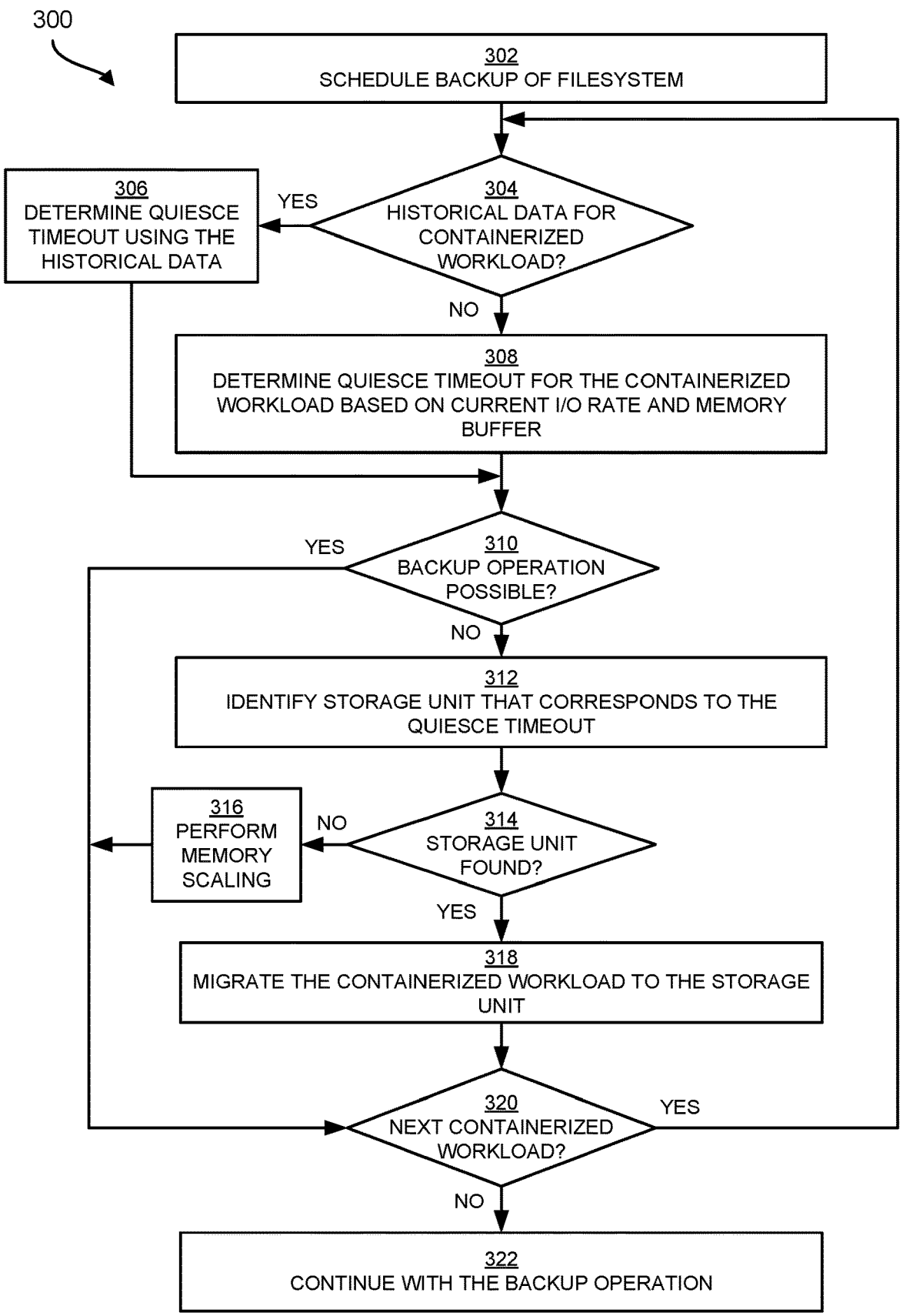
FIG. 3 is a flow diagram illustrating an example method for managing storage unit allocations based on quiesce timeouts for containerized workloads, in accordance with some embodiments of the present disclosure.

FIG. 3 is a flow diagram that illustrates an example method 300 for managing storage unit allocations based on quiesce timeouts for containerized workloads, in accordance with some embodiments of the present disclosure. In operation 302, the method 300 begins by scheduling a backup operation of a filesystem utilized by a containerized workload executing in a container environment. As part of scheduling the backup operation, the method 300 determines whether the backup operation can be preformed successfully. Success of the backup operation is based in part on whether a backup (e.g., snapshot) can be created and/or deleted without an occurrence of an I/O overflow associated one or more containerized workloads that utilize the filesystem. To help determine whether the backup operation can be performed successfully, the method 300 calculates a quiesce timeout for each containerized workload that utilizes the filesystem and evaluates storage units assigned to the containerized workloads to determine whether the specifications of the storage units correspond to the quiesce timeouts of the containerized workloads.

More specifically, in operation 304, the method 300 determines the existence of historical data (historical workload data 118 in FIG. 1) for a containerized workload. The historical data can comprise historical I/O performance metrics associated with the containerized workload. In the case that historical data for the containerized workload is available, then in operation 306, the method 300 determines a quiesce timeout for the containerized workload using the historical data. For example, the historical data can be used to estimate a current I/O rate for the containerized workload, and the quiesce timeout for the containerized workload can be calculated using the estimated I/O rate and specifications of a memory buffer available to store I/O associated with the containerized workload during performance of the backup operation.

In the case that historical data is not available for the containerized workload, then in operation 308, the method 300 determines a quiesce timeout for the containerized workload using a current (e.g., real-time or near real-time) I/O rate associated with the containerized workload and specifications of a memory buffer available to store the I/O associated with the containerized workload during performance of the backup operation. For example, the current I/O rate can be determined by monitoring I/O operations associated with the containerized workload. Resource usage of a containerized workload can be provided to the container orchestration system by a node agent executing on a node that hosts the containerized workload, and the method 300 can use the resource usage information to determine the I/O rate for the containerized workload.

Alternatively, in some embodiments, if historical data is not available for the respective containerized workload, the method 300 can attempt to identify historical data associated with one or more similar containerized workloads that have similar specifications to that of the respective containerized workload. In the case that one or more similar containerized workloads are identified, the method 300 analyzes the historical data for the similar containerized workloads to estimate an I/O rate for use in calculating a quiesce timeout for the respective containerized workload.

After determining the quiesce timeout for the containerized workload, in operation 310, the method 300 determines, based on the quiesce timeout, whether the backup operation can be performed successfully. That is, the method 300 determines whether the storage unit assigned to the containerized workload is capable of performing a backup of the filesystem within a time period indicated by the quiesce timeout. The determination of whether the storage unit is capable of performing the backup within the quiesce timeout can be determined via evaluation of the storage unit's specifications (e.g., read/write speed, buffer flush rate, etc.), as described earlier in association with FIG. 2.

In the case of a determination that the backup operation can successfully be performed by the storage unit currently assigned to the containerized workload, then the method 300 continues to operation 320 to determine whether there are additional containerized workloads to evaluate. In the case of a determination that the backup operation cannot be successfully performed by the storage unit, the method 300 continues to operation 312, which attempts to identify another storage unit that is capable of performing the backup operation. For example, as described earlier in association with FIG. 2, various storage units in a container environment may be available for assignment to containerized workloads. The method 300 can evaluate the specifications (e.g., read/write speed, buffer flush rate, etc.) of the storage units to identify an alternative storage unit that is capable of performing the backup operation within the quiesce timeout of the containerized workload.

In operation 314, if an alternative storage unit is found, then in operation 318, the method 300 migrates the containerized workload from the originally assigned storage unit determined to have insufficient computing resources to enable backup processing within the quiesce timeout of the containerized workload to the alternative storage unit. Migration of the containerized workload can comprise, copying data associated with the containerized workload from disk storage of the originally assigned storage unit to disk storage of the alternative storage unit, and pointing the containerized workload to the alternative storage unit. Thereafter, the method 300 continues to operation 320 to determine whether there are additional containerized workloads to evaluate.

Returning again to operation 314, in the case that an alternative storage unit cannot be found for the containerized workload, then in operation 316, the container orchestration system performs memory scaling to increase an amount of a node's memory that is allocated to buffering the containerized workload's I/O. The increase in allocated memory can be an amount that prevents an I/O overflow during performance of the backup operation. The method 300 then continues to operation 320 to determine whether there are additional containerized workloads to evaluate. After performing the operations above for each containerized workload that utilizes the filesystem, the method 300 continues to operation 322 to allow the backup operation to be scheduled.

Figure 4:
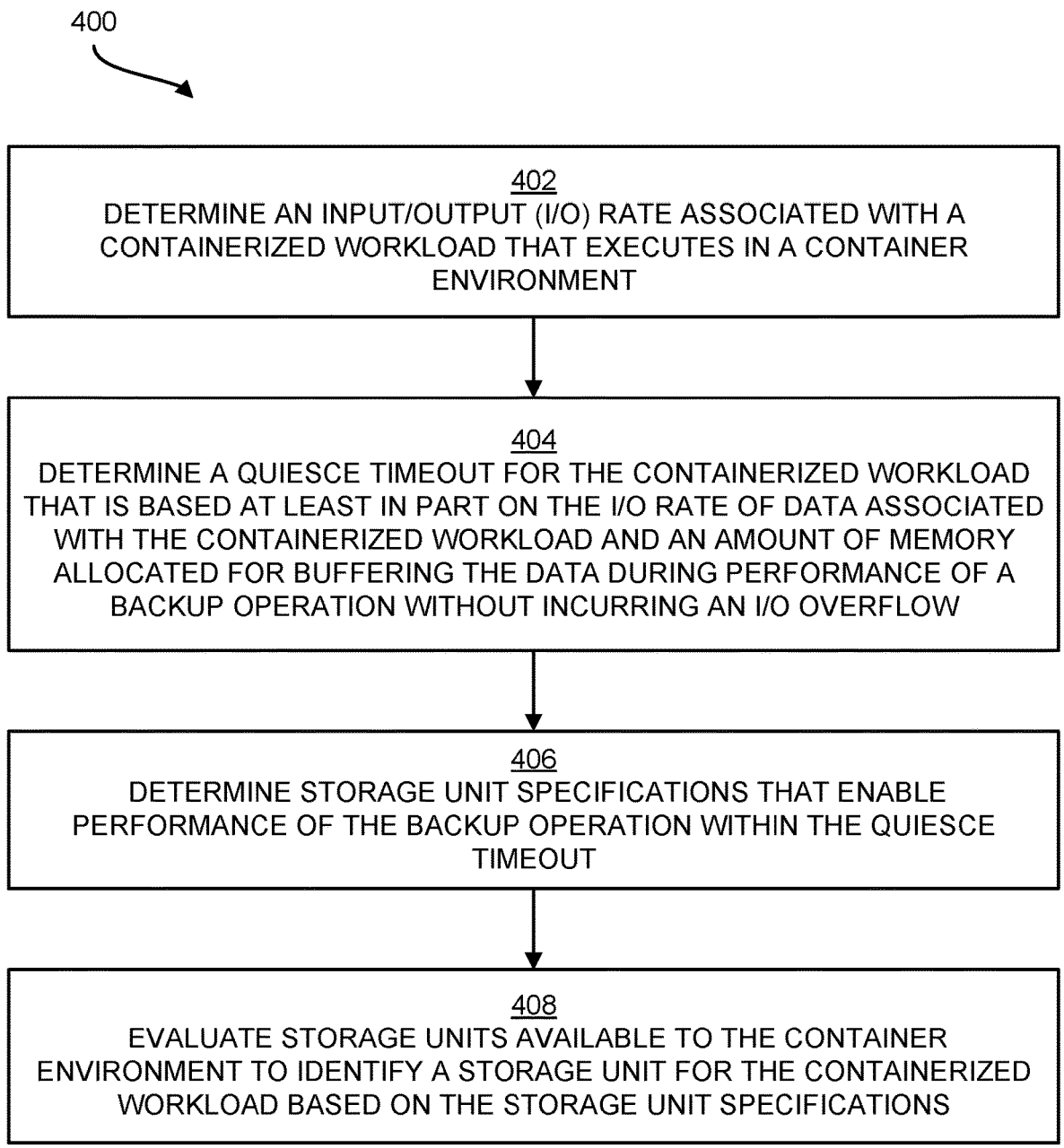
FIG. 4 is a flow diagram illustrating an example method for determining a quiesce timeout for a containerized workload used to identify a storage unit for the containerized workload, in accordance with some embodiments of the present disclosure.

FIG. 4 is a flow diagram illustrating an example method 400 for determining a quiesce timeout for a containerized workload used to identify a storage unit for the containerized workload, in accordance with some embodiments of the present disclosure. In some embodiments, a container orchestration system automates allocation of a storage unit to enable creation of the snapshot within a quiesce timeout of a containerized workload.

Beginning in operation 402, the method 400 determines an I/O rate associated with a containerized workload that executes in a container environment, where the containerized workload interfaces with a storage system to store the data. In some embodiments, determining the I/O rate for the containerized workload includes obtaining a historical I/O rate for the containerized workload and estimating a current I/O rate for the containerized workload that is based on the historical I/O rate. In some embodiments, determining the I/O rate associated with the containerized workload includes monitoring the current I/O operations associated with the containerized workload to determine the I/O rate.

In operation 404, the method 400 determines a quiesce timeout for the containerized workload that is based at least in part on the I/O rate of data associated with the containerized workload and an amount of memory allocated for buffering the data during performance of a backup operation without incurring an I/O overflow. In some embodiments, determining the quiesce timeout includes estimating a time for completing pending filesystem operations associated with the containerized workload, and estimating a time to copy the data from the memory allocated for buffering to persistent storage (e.g., the storage unit assigned to the containerized workload).

In operation 406, the method 400 determines storage unit specifications that enable performance of the backup operation within the quiesce timeout, and in operation 408, the method 400 evaluates storage units available to the container environment to identify a storage unit for the containerized workload based on the storage unit specifications.

In some embodiments, the method 400 migrates the containerized workload to a storage unit that corresponds to the storage unit specifications. Migration of the containerized storage unit includes moving the containerized workload, from an originally assigned storage unit determined to have insufficient computing resources to enable snapshot processing within the quiesce timeout, to the storage unit identified as having storage unit specifications that enable performance of the backup operation within the quiesce timeout.

In some embodiments, in response to determining that the storage units available to the container environment do not correspond to the storage unit specifications that enable creation of the snapshot within the quiesce timeout, the method 400 allocates additional memory to the containerized workload to enable buffering of the I/O associated with the containerized workload during backup processing.

The methods described above can be performed by a computer (e.g., computer 501 in FIG. 5), performed in a cloud environment (e.g., clouds 506 or 505 in FIG. 5), and/or generally can be implemented in fixed-functionality hardware, configurable logic, logic instructions, etc., or any combination thereof.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 5, computing environment 500 contains an example of an environment for the execution of at least some of the computer code involved in performing the disclosed methods, such as block 550 containing container orchestration code that determines a quiesce timeout for a containerized workload used to identify a storage unit for the containerized workload. In addition to block 550, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 550, as identified above), peripheral device set 514 (including user interface (UI), device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 521 and the other storage media discussed below. The computer readable program instructions, and associated data, are accessed by processor set 510 to control and direct performance of the disclosed methods. In computing environment 500, at least some of the instructions for performing the disclosed methods may be stored in block 550 in persistent storage 513.

COMMUNICATION FABRIC 511 is the signal conduction paths that allow the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid-state storage devices. Operating system 522 may take several forms, such as various known proprietary operating systems or open-source Portable Operating System Interface type operating systems that employ a kernel. The code included in block 550 typically includes at least some of the computer code involved in performing the disclosed methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the disclosed methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A computer-implemented method comprising:
   determining, by a container orchestration system, an Input/Output (I/O) rate associated with a containerized workload that executes in a container environment, wherein the containerized workload interfaces with a storage system to store I/O data;
   calculating, by the container orchestration system, a quiesce timeout for the containerized workload to allow a backup operation to be performed without incurring a buffer overflow of the I/O data, wherein the calculating:
      determines, based on the I/O rate associated with the containerized workload, a first amount of time in which the I/O data can be buffered during a backup operation of a filesystem without experiencing an I/O overflow,
      determines a second amount of time needed to quiesce the filesystem, and
      sums the first amount of time with the second amount of time;
   determining, by the container orchestration system, storage unit specifications that enable performance of the backup operation within the quiesce timeout; and
   evaluating, by the container orchestration system, storage units available to the container environment to identify a storage unit for the containerized workload based on the storage unit specifications.

2. The computer-implemented method of claim 1, wherein determining the I/O rate associated with the containerized workload further comprises:
   obtaining a historical I/O rate for the containerized workload.

3. The computer-implemented method of claim 1, wherein determining the I/O rate associated with the containerized workload further comprises:
   monitoring, by the container orchestration system, current I/O operations associated with the containerized workload to determine the I/O rate.

4. The computer-implemented method of claim 1, wherein evaluating the storage units to identify the storage unit for the containerized workload is performed as part of scheduling the containerized workload for deployment, and
   wherein the method further comprises mapping the containerized workload to the storage unit as part of scheduling the containerized workload for deployment.

5. The computer-implemented method of claim 1, further comprising:
   migrating the containerized workload to the storage unit that corresponds to the storage unit specifications, wherein the containerized workload is moved from a currently assigned storage unit determined to have insufficient computing resources to the storage unit that enables backup processing within the quiesce timeout.

6. The computer-implemented method of claim 1, further comprising:
   determining, by the container orchestration system, that the storage units available to the container environment do not correspond to the storage unit specifications to enable creation of a backup within the quiesce timeout; and
   allocating, by the container orchestration system, additional memory to the containerized workload to enable buffering of the I/O data associated with the containerized workload during the backup operation.

7. The computer-implemented method of claim 1, wherein the container orchestration system automates allocation of the storage unit to enable creation of a backup within the quiesce timeout.

8. A system comprising:
   one or more computer readable storage media storing program instructions and one or more processors which, in response to executing the program instructions, are configured to:
   determine, by a container orchestration system, an Input/Output (I/O) rate associated with a containerized workload that executes in a container environment, wherein the containerized workload interfaces with a storage system to store I/O data;
   calculate, by the container orchestration system, a quiesce timeout for the containerized workload to allow a backup operation to be performed without incurring a buffer overflow of the I/O data, wherein the calculating:
   determines, based on the I/O rate associated with the containerized workload, a first amount of time in which the I/O data can be buffered during a backup operation of a filesystem without experiencing an I/O overflow,
   determines a second amount of time needed to quiesce the filesystem, and
   sums the first amount of time with the second amount of time;
   determine, by the container orchestration system, storage unit specifications that enable performance of the backup operation within the quiesce timeout; and
   evaluate, by the container orchestration system, storage units available to the container environment to identify a storage unit for the containerized workload based on the storage unit specifications.

9. The system of claim 8, wherein the program instructions configured to cause the one or more processors to determine the I/O rate associated with the containerized workload are further configured to cause the one or more processors to:
   monitor current I/O operations associated with the containerized workload to determine the I/O rate.

10. The system of claim 8, wherein the program instructions configured to cause the one or more processors to determine the I/O rate associated with the containerized workload are further configured to cause the one or more processors to:
    obtain a historical I/O rate for the containerized workload.

11. The system of claim 8, wherein the program instructions configured to cause the one or more processors to evaluate the storage units are further configured to cause the one or more processors to:
    map the containerized workload to the storage unit as part of scheduling the containerized workload for deployment.

12. The system of claim 8, wherein the program instructions are further configured to cause the one or more processors to:
    migrate the containerized workload to the storage unit that corresponds to the storage unit specifications, wherein the containerized workload is moved from an originally assigned storage unit determined to have insufficient computing resources to the storage unit that enables backup processing within the quiesce timeout.

13. The system of claim 8, wherein the program instructions are further configured to cause the one or more processors to:
    determine that the storage units available to the container environment do not correspond to the storage unit specifications to enable creation of a backup within the quiesce timeout; and
    allocate additional memory to the containerized workload to enable buffering of the I/O data associated with the containerized workload during the backup operation.

14. The system of claim 8, wherein the container orchestration system automates allocation of the storage unit to enable creation of a backup within the quiesce timeout.

15. A computer program product comprising:
    one or more computer readable storage media, and program instructions collectively stored on the one or more computer readable storage media, the program instructions configured to cause one or more processors to:
    determine, by a container orchestration system, an Input/Output (I/O) rate associated with a containerized workload that executes in a container environment, wherein the containerized workload interfaces with a storage system to store I/O data;
    calculate, by the container orchestration system, a quiesce timeout for the containerized workload to allow a backup operation to be performed without incurring a buffer overflow of the I/O data, where the calculating:
    determines, based on the I/O rate associated with the containerized workload, a first amount of time in which the I/O data can be buffered during a backup operation of a filesystem without experiencing an I/O overflow,
    determines a second amount of time needed to quiesce the filesystem, and sums the first amount of time with the second amount of time;

determine, by the container orchestration system, storage unit specifications that enable performance of the backup operation within the quiesce timeout; and evaluate, by the container orchestration system, storage units available to the container environment to identify a storage unit for the containerized workload based on the storage unit specifications.

16. The computer program product of claim 15, wherein the program instructions configured to cause the one or more processors to determine the I/O rate associated with the containerized workload are further configured to cause the one or more processors to:

monitor current I/O operations associated with the containerized workload to determine the I/O rate.

17. The computer program product of claim 15, wherein the program instructions configured to cause the one or more processors to determine the I/O rate associated with the containerized workload are further configured to cause the one or more processors to:

obtain a historical I/O rate for the containerized workload.

18. The computer program product of claim 15, wherein the program instructions configured to cause the one or more processors to evaluate the storage units are further configured to cause the one or more processors to:

map the containerized workload to the storage unit as part of scheduling the containerized workload for deployment.

19. The computer program product of claim 15, wherein the program instructions are further configured to cause the one or more processors to:

migrate the containerized workload to the storage unit that corresponds to the storage unit specifications, wherein the containerized workload is moved from an originally assigned storage unit determined to have insufficient computing resources to the storage unit that enables backup processing within the quiesce timeout.

20. The computer program product of claim 15, wherein the program instructions are further configured to cause the one or more processors to:

determine that the storage units available to the container environment do not correspond to the storage unit specifications to enable creation of a backup within the quiesce timeout; and allocate additional memory to the containerized workload to enable buffering of the I/O data associated with the containerized workload during the backup operation.

* * * * *